US006480896B1

(12) United States Patent
Brown et al.

(10) Patent No.: US 6,480,896 B1
(45) Date of Patent: Nov. 12, 2002

(54) SYSTEMS AND METHODS FOR GENERATING AND COMMUNICATING MOTION DATA THROUGH A DISTRIBUTED NETWORK

(75) Inventors: David W. Brown, Bingen; Jay S. Clark, Seattle, both of WA (US)

(73) Assignee: Roy-G-Biv Corporation, Bingen, WA (US)

( * ) Notice: Subject to any disclaimer, the term of this patent is extended or adjusted under 35 U.S.C. 154(b) by 0 days.

(21) Appl. No.: 09/699,132

(22) Filed: Oct. 27, 2000

Related U.S. Application Data

(60) Provisional application No. 60/161,901, filed on Oct. 27, 1999, provisional application No. 60/162,989, filed on Nov. 1, 1999, provisional application No. 60/162,802, filed on Nov. 1, 1999, provisional application No. 60/162,801, filed on Nov. 1, 1999, provisional application No. 60/182,864, filed on Feb. 16, 2000, and provisional application No. 60/185,192, filed on Feb. 25, 2000.

(51) Int. Cl.$^7$ ............................................. G06F 15/16
(52) U.S. Cl. ...................... 709/231; 709/218; 709/219; 700/56; 700/68; 700/302; 707/561; 345/473; 345/474
(58) Field of Search ................................. 709/201–203, 709/100, 230, 302, 218, 204; 700/56, 86, 302, 83; 707/501; 345/473, 733

(56) References Cited

U.S. PATENT DOCUMENTS

| 4,159,417 | A | 6/1979 | Rubincam |
| 4,418,381 | A | 11/1983 | Molusis et al. |
| 4,531,182 | A | 7/1985 | Hyatt |
| 4,713,808 | A | 12/1987 | Gaskill |
| 4,767,334 | A | 8/1988 | Thorne et al. |
| 4,809,335 | A | 2/1989 | Rumsy |
| 4,840,602 | A | 6/1989 | Rose |
| 4,846,693 | A | 7/1989 | Baer |

(List continued on next page.)

FOREIGN PATENT DOCUMENTS

| EP | 0442676 A2 | 8/1991 |
| EP | 0 281 427 B1 | 8/1992 |
| EP | 0508912 A1 | 10/1992 |
| EP | 0 583 908 A2 | 2/1994 |
| EP | 0275826 A1 | 7/1998 |
| GB | 2 224 896 A | 12/1991 |
| JP | 59 228473 | 6/1983 |
| WO | WO 92/11731 | 7/1992 |
| WO | WO 93/08654 | 4/1993 |
| WO | WO 95/07504 | 3/1995 |

OTHER PUBLICATIONS

WOSA Backgrounder: Delivering Enterprise Services to the Windows–based Desktop, Jul. 1993, Microsoft Development Library; pp. 1–19.

WOSA INSIDE WINDOWS 95; pp. 348–351.

Software Products for Industrial Automation, ICONICS; 6 pages.

WEB 3.0 Product Brochure, Trihedral Engineering Ltd. (1994); 6 pages.

(List continued on next page.)

Primary Examiner—Dung C. Dinh
Assistant Examiner—Hieu C. Le
(74) Attorney, Agent, or Firm—Michael R. Schacht (57) ABSTRACT

A control software system for generating and distributing motion media for operating a target motion device. The control software system generates the motion media based on a motion program generated at a content server. The control software system distributes the motion media to a client browser associated with the target motion device.

14 Claims, 7 Drawing Sheets

U.S. PATENT DOCUMENTS

| | | | |
|---|---|---|---|
| 4,855,725 A | | 8/1989 | Fernandez |
| 4,857,030 A | | 8/1989 | Rose |
| 4,887,966 A | | 12/1989 | Gellerman |
| 4,897,835 A | | 1/1990 | Gaskill |
| 4,937,737 A | | 6/1990 | Schwane et al. |
| 5,095,445 A | | 3/1992 | Sekiguchi |
| 5,120,065 A | | 6/1992 | Driscoll et al. |
| 5,126,932 A | | 6/1992 | Wolfson et al. |
| 5,168,441 A | | 12/1992 | Onarheim et al. |
| 5,175,817 A | | 12/1992 | Adams et al. |
| 5,245,703 A | | 9/1993 | Hubert |
| 5,247,650 A | | 9/1993 | Judd et al. |
| 5,377,258 A | | 12/1994 | Bro |
| 5,390,330 A | | 2/1995 | Talati |
| 5,392,207 A | | 2/1995 | Wilson et al. |
| 5,402,518 A | | 3/1995 | Lowery |
| 5,412,757 A | | 5/1995 | Endo |
| 5,450,079 A | | 9/1995 | Dunaway |
| 5,453,933 A | | 9/1995 | Wright et al. |
| 5,465,215 A | | 11/1995 | Strickland et al. |
| 5,491,813 A | | 2/1996 | Bondy et al. |
| 5,493,281 A | | 2/1996 | Owens |
| 5,596,994 A | | 1/1997 | Bro |
| 5,600,373 A | | 2/1997 | Chui et al. |
| 5,604,843 A | | 2/1997 | Shaw et al. |
| 5,607,336 A | | 3/1997 | Lebensfeld et al. |
| 5,608,894 A | | 3/1997 | Kawakami et al. |
| 5,617,528 A | | 4/1997 | Stechmann et al. |
| 5,636,994 A | | 6/1997 | Tong |
| 5,652,866 A | | 7/1997 | Aldred et al. |
| 5,655,945 A | | 8/1997 | Jani |
| 5,666,161 A | | 9/1997 | Kohiyama et al. |
| 5,670,992 A | | 9/1997 | Yasuhara et al. |
| 5,691,897 A | * | 11/1997 | Brown et al. .................. 700/56 |
| 5,707,289 A | | 1/1998 | Watanabe et al. |
| 5,733,131 A | | 3/1998 | Park |
| 5,737,523 A | | 4/1998 | Callaghan et al. |
| 5,746,602 A | | 5/1998 | Kikinis |
| 5,752,880 A | | 5/1998 | Gabai et al. |
| 5,764,155 A | | 6/1998 | Kertesz et al. |
| 5,790,178 A | | 8/1998 | Shibata et al. |
| 5,800,268 A | | 9/1998 | Molnick |
| 5,801,946 A | | 9/1998 | Nissen et al. |
| 5,818,537 A | | 10/1998 | Enokida et al. |
| 5,821,987 A | | 10/1998 | Larson |
| 5,822,207 A | | 10/1998 | Hazama et al. |
| 5,828,575 A | | 10/1998 | Sakai |
| 5,846,132 A | | 12/1998 | Junkin |
| 5,852,441 A | | 12/1998 | Nakaiima et al. |
| 5,855,483 A | | 1/1999 | Collins et al. |
| 5,867,385 A | | 2/1999 | Brown et al. |
| 5,873,765 A | | 2/1999 | Rifkin et al. |
| 5,890,963 A | | 4/1999 | Yen |
| 5,907,704 A | | 5/1999 | Gudmundson et al. |
| 5,907,831 A | | 5/1999 | Lotvin et al. |
| 5,914,876 A | | 6/1999 | Hirai |
| 5,920,476 A | | 7/1999 | Hennessey et al. |
| 5,924,013 A | | 7/1999 | Guido et al. |
| 5,960,085 A | | 9/1999 | De La Huerga |
| 5,977,951 A | | 11/1999 | Danieli et al. |
| 6,078,968 A | | 6/2000 | Lo et al. |
| 6,101,425 A | | 8/2000 | Govindaraj et al. |
| 6,139,177 A | * | 10/2000 | Venkatraman et al. ........ 700/83 |
| 6,144,895 A | | 11/2000 | Govindaraj et al. |
| 6,209,037 B1 | | 3/2001 | Brown et al. |
| 6,216,173 B1 | * | 4/2001 | Jones et al. .................. 709/302 |

OTHER PUBLICATIONS

The Complete, Computer–Based Automation Tool (IGSS) Seven Technologies A/S; 6 pages.

Oregon Micro Systems Product Guide: pp. 1–20.

AIMAX–WIN Product Brochure, TA Engineering Co., Inc.; 8 pages.

XANALOG Model NL–SIM Product Brochure, XANALOG, 4 pages.

ExperTune PID Tuning Software, Gerry Engineering Software; 6 pages.

PMAC Product Catalog, page 43.

Paragon TNT Product Brochure, Intec Controls Corp.; 6 pages.

Aerotech Motion Control Product Guide; pp. 233–234.

OpenBatch Product Brief, PID, Inc.; 6 pages.

PC/DSP–Series Motion Controller C Programming Guide; pp. 1–54.

FIX Product Brochure, Intellution (1994); 6 pages.

Precision Motion Controls Product Guide; page 17.

Compumotor Digiplan (1993–1994) Catalog pp. 10–11.

Sue Chen, Jonathon Lin; "Computer Numerical Control: Essentials in Programming and Networking"; Part 5, Chapter 27; pp. 824–848.

Pritschow et al.; "Open System Controllers: Challenge for the Future of the Machine Tool Industry"; pub. Jan. 15, 1993; pp. 449–452.

William E. Ford; "What Is an Open Architecture Robot Controller" pub. Aug. 16, 1994; pp. 27–32.

Marcos et al.; "A New Solution for Integrating Control Devices Involved in Computer–Integrated Manufacturing"; pub Sep. 2, 1996; pp. 485–490.

Chu and Wang; "Development of a Practical SFC System for CNC Machine Shop"; pub. 1994; pp. 362–367.

Microsoft; "The Microsoft Object Technology Strategy"; pub. Mar. 1994; pp. 1–33.

Microsoft; "Open Systems: Technology, Leadership, and Collaboration"; pub. Mar. 1994; pp. 1–15.

Microsoft; Microsoft OLE Today and Tomorrow: Technology Overview; pub. Dec. 1993; pp. 1–9.

Microsoft; "Object Linking and Embedding 2.0 Backgrounder"; pub. Sep. 1993; pp. 1–15.

Robert Anderson; "SMART: A Modular Architecture for Robotics and Teleoperation"; pub. 1993; pp. 416–421.

Proctor et al.; "Validation of Standard Interfaces from a Machine Control"; pub. 1996; pp. 659–664.

Altintas et al.; "Design and Analysis of a Modular CNC System"; pub. Mar. 4, 1990; pp. 305–316.

Wright et al.; "Open Architecture Manufacturing: The Impact of Open–System Computers on Self–sustaining Machinery and the Machine Tool Industry"; pp. 41–47.

Protoctor et al.; "Open Architecture Controllers"; pub. Jun. 1997; pp. 60–64.

Lutz et al.; "OSACA–The Vendor–Neutral Control Architecture"; pub. Dec. 1997; pp. 247–256.

Morales et al.; "A Generalised Software Control System for Industrial Robots"; pub. 1998; pp. 411–416.

Feng et al; "Distributed Control of a Multiple–Tethered Mobile Robot System for Highway Maintenance and Construction"; pub Nov. 1997; pp. 383–392.

Fedrowitz; "IRL–Based Expansion of the Commonly Used High–Level Language C for Robot Programming:" pub. Oct. 1995; 5 pages.

Szabo et al.; "Validation Results of Specifications for Motion Control Interoperability"; pub. 1997; pp. 166–167.

Chang et al; "Development and Implementation of an Application Programming Interface for PC/DSP–based Motion Control System"; pub. 1998; pp. 94–105.

Michaloski et al.; "A Framework for Component–base CNC Machines" pub. Nov. 1998; pp. 132–143.

Bouzouia et al.; "A Three–layer Workcell Control Architecture Design"; pub. May 1998; pp. 1185–1191.

Morales et al.; "GENERIS: The EC–JRC Generalized Software Control System for Industrial Robots"; pub. 1999; pp. 26–33.

Muir et al.; "Mechatronic Objects for Real–time Control Software Development"; pub. Nov. 1998; pp. 251–265.

Cho et al.; "A CompactOpen Network–based Controller Incorporating Modular Software Architecture for a Humanoid Robot"; pub. 1999; pp. 341–355.

McGraw et al.; "A Friendly Command, Control, and Information System for Astronomy"; pub. 1996; pp. 356–367.

Jackman; "Robotic Control Using Sequential Function Charts"; pub. 1996; pp. 120–128.

Mizukawa et al.; "De–facto Standard API for Open and Networked Industrial Robots"; pub. Oct. 1999; pp. 455–462.

Leu et al.; "A Telemanufacturing Workcell over the Internet"; pub. Nov. 1998; pp. 230–237.

Natale et al.; "Robust Hybrid Force/Position Control with Experiments on an Industrial Robot"; pub. Sep. 19, 1999; pp. 956–961.

Nilsson et al.; "Integrated Architecture for Industrial Robot Programming and Control"; pub. Dec. 31, 1999; pp. 205–226.

Valera et al.; "Interactive Online Evaluation of Robot Motion Control"; pub. Aug. 22, 1999; pp. 1039–1043.

"Nemi Low–cost Controller Project"; pub. Dec. 1996; total pages 392.

Sperling; "Designing Applications for an OSACA Control"; pub. Nov. 16, 1997; 5 pages.

Lutz et al.; "OSACA: The Vendor–neutral Control Architecture"; pub. 1997; 10 pages.

Sperling et al.; "Enabling Open Control Systems: An Introduction to the OSACA System Platform"; pub. May 1996; pp. 1–8.

"Requirements of Open Modular Architecture Controllers for Applications in the Automative Industry"; pub. Dec. 13, 1994; pp. 1–13.

"Open, Modular Architecture Controls at GM Powertrain"; pub. May 14, 1996; pp. 1–33.

"Technologies Enabling Agile Manufacturing (TEAM) Intelligent Closed Loop Processing"; pub. Jan. 11, 1996; 30 pages.

* cited by examiner

SYSTEMS AND METHODS FOR GENERATING AND COMMUNICATING MOTION DATA THROUGH A DISTRIBUTED NETWORK

RELATED APPLICATIONS

This application claims priority of U.S. Provisional Patent Application Serial No. 60/161,901 filed on Oct. 27, 1999; No. 60/162,989 filed on Nov. 1, 1999; No. 60/162,802 filed on Nov. 1, 1999; No. 60/162,801 filed on Nov. 1, 1999; No. 60/182,864 filed on Feb. 16, 2000; and No. 60/185,192 which was filed on Feb. 25, 2000.

TECHNICAL FIELD

The present invention relates to motion control systems and, more particularly, to a software system that facilitates the creation and distribution of motion control software.

BACKGROUND OF THE INVENTION

The purpose of a motion control device is to move an object in a desired manner. The basic components of a motion control device are a controller and a mechanical system. The mechanical system translates signals generated by the controller into movement of an object.

While the mechanical system commonly comprises a drive and an electrical motor, a number of other systems, such as hydraulic or vibrational systems, can be used to cause movement of an object based on a control signal. Additionally, it is possible for a motion control device to comprise a plurality of drives and motors to allow multi-axis control of the movement of the object.

The present invention is of particular importance in the context of a target device or system including at least one drive and electrical motor having a rotating shaft connected in some way to the object to be moved, and that application will be described in detail herein. But the principles of the present invention are generally applicable to any target device or system that generates movement based on a control signal. The scope of the present invention should thus be determined based on the claims appended hereto and not the following detailed description.

In a mechanical system comprising a controller, a drive, and an electrical motor, the motor is physically connected to the object to be moved such that rotation of the motor shaft is translated into movement of the object. The drive is an electronic power amplifier adapted to provide power to a motor to rotate the motor shaft in a controlled manner. Based on control commands, the controller controls the drive in a predictable manner such that the object is moved in the desired manner.

These basic components are normally placed into a larger system to accomplish a specific task. For example, one controller may operate in conjunction with several drives and motors in a multi-axis system for moving a tool along a predetermined path relative to a workpiece.

Additionally, the basic components described above are often used in conjunction with a host computer or programmable logic controller (PLC). The host computer or PLC allows the use of a high-level programming language to generate control commands that are passed to the controller. Software running on the host computer is thus designed to simplify the task of programming the controller.

Companies that manufacture motion control devices are, traditionally, hardware oriented companies that manufacture software dedicated to the hardware that they manufacture. These software products may be referred to as low level programs. Low level programs usually work directly with the motion control command language specific to a given motion control device. While such low level programs offer the programmer substantially complete control over the hardware, these programs are highly hardware dependent.

In contrast to low-level programs, high-level software programs, referred to sometimes as factory automation applications, allow a factory system designer to develop application programs that combine large numbers of input/output (I/O) devices, including motion control devices, into a complex system used to automate a factory floor environment. These factory automation applications allow any number of I/O devices to be used in a given system, as long as these devices are supported by the high-level program. Custom applications, developed by other software developers, cannot be developed to take advantage of the simple motion control functionality offered by the factory automation program.

Additionally, these programs do not allow the programmer a great degree of control over the each motion control device in the system. Each program developed with a factory automation application must run within the context of that application.

In this overall context, a number of different individuals are involved with creating a motion control system dedicated to performing a particular task. Usually, these individuals have specialized backgrounds that enable them to perform a specific task in the overall process of creating a motion control system. The need thus exists for systems and methods that facilitate collaboration between individuals of disparate, complimentary backgrounds who are cooperating on the development of motion control systems.

Conventionally, the programming and customization of motion systems is very expensive and thus is limited to commercial industrial environments. However, the use of customizable motion systems may expand to the consumer level, and new systems and methods of distributing motion control software, referred to herein as motion media, are required.

PRIOR ART

A number of software programs currently exist for programming individual motion control devices or for aiding in the development of systems containing a number of motion control devices.

The following is a list of documents disclosing presently commercially available high-level software programs: (a) Software Products For Industrial Automation, iconics 1993; (b) The complete, computer-based automation tool (IGSS), Seven Technologies A/S; (c) OpenBatch Product Brief, PID, Inc.; (d) FIX Product Brochure, Intellution (1994); (e) Paragon TNT Product Brochure, Intec Controls Corp.; (f) WEB 3.0 Product Brochure, Trihedral Engineering Ltd. (1994); and (g) AIMAX-WIN Product Brochure, TA Engineering Co., Inc. The following documents disclose simulation software: (a) ExperTune PID Tuning Software, Gerry Engineering Software; and (b) XANALOG Model NL-SIM Product Brochure, XANALOG.

The following list identifies documents related to low-level programs: (a) Compumotor Digiplan 1993–94 catalog, pages 10–11; (b) Aerotech Motion Control Product Guide, pages 233–34; (c) PMAC Product Catalog, page 43; (d) PC/DSP-Series Motion Controller C Programming Guide, pages 1–3; (e) Oregon Micro Systems Product Guide, page 17; (f) Precision Microcontrol Product Guide.

The Applicants are also aware of a software model referred to as WOSA that has been defined by Microsoft for use in the Windows programming environment. The WOSA model is discussed in the book Inside Windows 95, on pages 348–351. WOSA is also discussed in the paper entitled WOSA Backgrounder: Delivering Enterprise Services to the Windows-based Desktop. The WOSA model isolates application programmers from the complexities of programming to different service providers by providing an API layer that is independent of an underlying hardware or service and an SPI layer that is hardware independent but service dependent. The WOSA model has no relation to motion control devices.

The Applicants are also aware of the common programming practice in which drivers are provided for hardware such as printers or the like; an application program such as a word processor allows a user to select a driver associated with a given printer to allow the application program to print on that given printer.

While this approach does isolates the application programmer from the complexities of programming to each hardware configuration in existence, this approach does not provide the application programmer with the ability to control the hardware in base incremental steps. In the printer example, an application programmer will not be able to control each stepper motor in the printer using the provided printer driver; instead, the printer driver will control a number of stepper motors in the printer in a predetermined sequence as necessary to implement a group of high level commands.

The software driver model currently used for printers and the like is thus not applicable to the development of a sequence of control commands for motion control devices.

The Applicants are additionally aware of application programming interface security schemes that are used in general programming to limit access by high-level programmers to certain programming variables. For example, Microsoft Corporation's Win32 programming environment implements such a security scheme. To the Applicants' knowledge, however, no such security scheme has ever been employed in programming systems designed to generate software for use in motion control systems.

SUMMARY OF THE INVENTION

The present invention is a system for generating and distributing motion media for motion control systems. A control software system is connected to a network such as the Internet. The control software system distributes motion media to clients through the network. Content servers connected to the network create application programs that can be directly transmitted to the clients as motion media or may be processed by a control command generating system that generates hardware independent motion media.

The control software system may include one or more of the following: a services manager module, a meta engine module, an interleaving engine module, a filtering engine module, and/or a streaming engine module. The software system further comprise memory for storing motion scripts, motion media, and/or rated motion media.

DETAILED DESCRIPTION OF THE INVENTION

Figure 1:
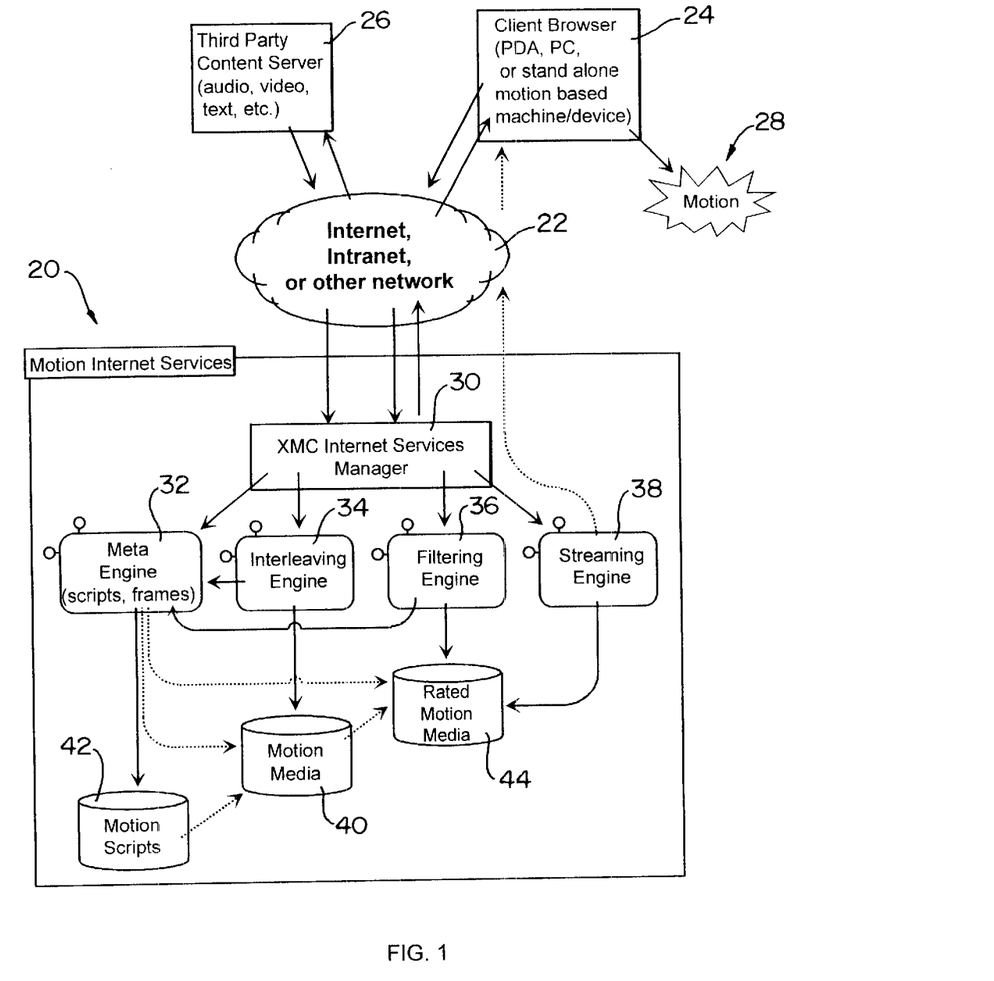
FIG. 1 is a system interaction map of an exemplary control software system constructed in accordance with the principles of the present invention.

Referring to FIG. 1 of the drawing, shown at 20 therein is a control software system adapted to generate, distribute, and collect motion content in the form of motion media over a distributed network 22 from and to a client browser 24 and a content server 26.

The distributed network 22 can be any conventional computer network such as a private intranet, the Internet, or other specialized or proprietary network configuration such as those found in the industrial automation market (e.g., CAN bus, DeviceNet, FieldBus, ProfiBus, Ethernet, Deterministic Ethernet, etc). The distributed network 22 serves as a communications link that allows data to flow among the control software system 20, the client browser 24, and the content server 26.

The client browsers 24 are associated with motion systems or devices that are owned and/or operated by end users. The client browser 24 includes or is connected to what will be referred to herein as the target device. The target device may be a hand-held PDA used to control a motion system, a personal computer used to control a motion system, an industrial machine, an electronic toy or any other type of motion based system that, at a minimum, causes physical motion. The client browser 24 is capable of playing motion media from any number of sources and also responds to requests for motion data from other sources such as the control software system 20. The exemplary client browser 24 receives motion data from the control software system 20.

The target device forming part of or connected to the client browser 24 is a machine or other system that, at a minimum, receives motion content instructions to run (control and configuration content) and query requests (query content). Each content type causes an action to occur on the client browser 24 such as changing the client browser's state, causing physical motion, and/or querying values from the client browser. In addition, the target device at the client browser 24 may perform other functions such as playing audio and/or displaying video or animated graphics.

The term "motion media" will be used herein to refer to a data set that describes the target device settings or actions currently taking place and/or directs the client browser 24 to perform a motion-related operation. The client browser 24 is usually considered a client of the host control software system 20; while one client browser 24 is shown, multiple client browsers will commonly be supported by the system 20. In the following discussion and incorporated materials, the roles of the system 20 and client browser 24 may be reversed such that the client browser functions as the host and the system 20 is the client.

Often, but not necessarily, the end users will not have the expertise or facilities necessary to develop motion media. In this case, motion media may be generated based on a motion program developed by the content providers operating the content servers 26. The content server systems 26 thus provides motion content in the form of a motion program from which the control software system 20 produces motion media that is supplied to the client browser 24.

The content server systems 26 are also considered clients of the control software system 20, and many such server systems 26 will commonly be supported by the system 20.

The content server 26 may be, but is not necessarily, operated by the same party that operates the control software system 20.

As briefly discussed above, the motion media used by the client browser 24 may be created and distributed by other systems and methods, but the control software system 20 described herein makes creation and distribution of such motion media practical and economically feasible.

Motion media comprises several content forms or data types, including query content, configuration content, control content, and/or combinations thereof. Configuration content refers to data used to configure the client browser 24. Query content refers to data read from the client browser 24. Control content refers to data used to control the client browser 24 to perform a desired motion task as schematically indicated at 28 in FIG. 1.

Content providers may provide non-motion data such as one or more of audio, video, Shockwave or Flash animated graphics, and various other types of data. In a preferred embodiment, the control software system 20 is capable of merging motion data with such non-motion data to obtain a special form of motion media; in particular, motion media that includes non-motion data will be referred to herein as enhanced motion media.

The present invention is of particular significance when the motion media is generated from the motion program using a hardware independent model such as that disclosed in U.S. Pat. Nos. 5,691,897 and 5,867,385 issued to the present Applicant, and the disclosure in these patents is incorporated herein by reference. However, the present invention also has application when the motion media is generated, in a conventional manner, from a motion program specifically written for a particular hardware device.

As will be described in further detail below, the control software system 20 performs one or more of the following functions. The control software system 20 initiates a data connection between the control software system 20 and the client browser 24. The control software system 20 also creates motion media based on input, in the form of a motion program, from the content server system 26. The control software system 20 further delivers motion media to the client browser 24 as either dynamic motion media or static motion media. Dynamic motion media is created by the system 20 as and when requested, while static motion media is created and then stored in a persistent storage location for later retrieval.

Referring again to FIG. 1, the exemplary control software system 20 comprises a services manager 30, a meta engine 32, an interleaving engine 34, a filtering engine 36, and a streaming engine 38. In the exemplary system 20, the motion media is stored at a location 40, motion scripts are stored at a location 42, while rated motion data is stored at a location 44. The storage locations may be one physical device or even one location if only one type of storage is required.

Not all of these components are required in a given control software system constructed in accordance with the present invention. For example, if a given control software system is intended to deliver only motion media and not enhanced motion media, the interleaving engine 34 may be omitted or disabled. Or if the system designer is not concerned with controlling the distribution of motion media based on content rules, the filtering engine 36 and rated motion storage location 44 may be omitted or disabled.

The services manager 30 is a software module that is responsible for coordinating all other modules comprising the control software system 20. The services manager 30 is also the main interface to all clients across the network.

The meta engine 32 is responsible for arranging all motion data, including queries, configuration, and control actions, into discrete motion packets. The meta engine 32 further groups motion packets into motion frames that make up the smallest number of motion packets that must execute together to ensure reliable operation. If reliability is not a concern, each motion frame may contain only one packet of motion data—i.e. one motion instruction. The meta engine 32 still further groups motion frames into motion scripts that make up a sequence of motion operations to be carried out by the target motion system. These motion packets and motion scripts form the motion media described above.

The interleaving engine 34 is responsible for merging motion media, which includes motion frames comprising motion packets, with non-motion data.

Motion frames are mixed with other non-motion data either on a time basis, a packet or data size basis, or a packet count basis. When mixing frames of motion with other media on a time basis, motion frames are synchronized with other data so that motion operations appear to occur in sync with the other media. For example, when playing a motion/audio mix, the target motion system may be controlled to move in sync with the audio sounds.

After merging data related to non-motion data (e.g., audio, video, etc) with data related to motion, a new data set is created. As discussed above, this new data set combining motion media with non-motion data will be referred to herein as enhanced motion media.

More specifically, the interleaving engine 34 forms enhanced motion media in one of two ways depending upon the capabilities of the target device at the client browser 22. When requested to use a non-motion format (as the default format) by either a third party content site or even the target device itself, motion frames are injected into the non-motion media. Otherwise, the interleaving engine 34 injects the non-motion media into the motion media as a special motion command of 'raw data' or specifies the non-motion data type (ie 'audio-data', or 'video-data'). By default, the interleaving engine 34 creates enhanced motion media by injecting motion data into non-motion data.

The filtering engine 36 injects rating data into the motion media data sets. The rating data, which is stored at the rating data storage location 44, is preferably injected at the beginning of each script or frame that comprises the motion media. The client browser 22 may contain rating rules and, if desired, filters all received motion media based on these rules to obtain filtered motion media.

In particular, client browser 22 compares the rating data contained in the received motion media with the ratings rules stored at the browser 22. The client browser 22 will accept motion media on a frame by frame or script basis when the ratings data falls within the parameters embodied by the ratings rules. The client browser will reject, wholly or in part, media on a frame by frame or script basis when the ratings data is outside the parameters embodied by the ratings rules.

In another embodiment, the filtering engine 36 may be configured to dynamically filter motion media when broadcasting rated motion data. The modification or suppression of inappropriate motion content in the motion media is thus performed at the filtering engine 36. In particular, the filtering engine 36 either prevents transmission of or downgrades the rating of the transmitted motion media such that the motion media that reaches the client browser 22 matches the rating rules at the browser 22.

Motion media is downgraded by substituting frames that fall within the target system rating rules for frames that do not fall within the target system's rating. The filtering engine 36 thus produces a data set that will be referred to herein as the rated motion media, or rated enhanced motion media if the motion media includes non-motion data.

The streaming engine 38 takes the final data set (whether raw motion scripts, enhanced motion media, rated motion media, or rated enhanced motion media) and transmits this final data set to the client browser 22. In particular, in a live-update session, the final data set is sent in its entirety to the client browser 22 and thus to the target device associated therewith. When streaming the data to the target device, the data set is sent continually to the target device. Optionally, the target system will buffer data until there is enough data to play ahead of the remaining motion stream received in order to maintain continuous media play. This is optional for the target device may also choose to play each frame as it is received yet network speeds may degrade the ability to play media in a continuous manner. This process may continue until the motion media data set ends, or, when dynamically generated, the motion media may play indefinitely.

Figure 2:
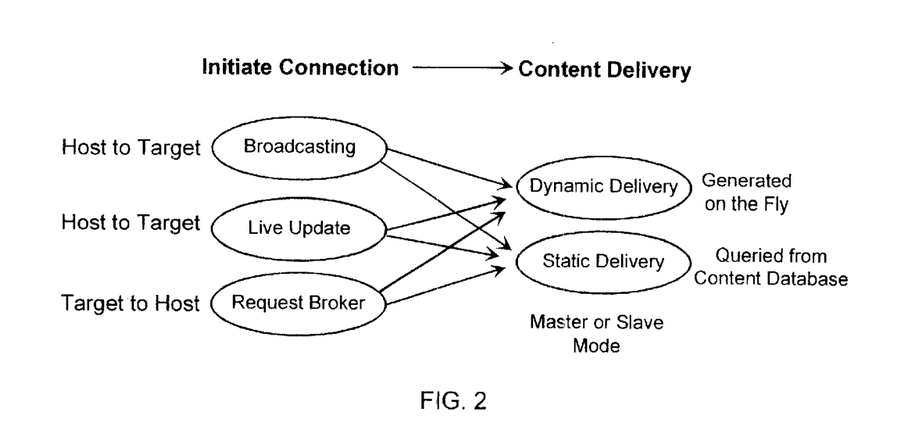
FIG. 2 is a block diagram depicting how the control software system of FIG. 1 can communicate with clients.

Referring now to FIG. 2, depicted therein is a block diagram illustrating the various forms in which data may be communicated among the host system software 20 and the target device at the client browser 22. Before any data can be sent between the host and the target, the network connection between the two must be initiated. There are several ways in which this initiation process takes place. As shown in FIG. 2, this initiation process may be accomplished by broadcasting, live update, and request broker.

In addition, FIG. 2 also shows that, once the connection is initiated between the host and target systems, the content delivery may occur dynamically or via a static pool of already created content. When delivering dynamic content, the content may be sent via requests from a third party content site in a slave mode, where the third party requests motion media from the host on behalf of the target system. Or the dynamic content may be delivered in a master mode where the target system makes direct requests for motion media from the host where the motion services reside.

In the following discussion, the scenario maps depicted in FIGS. 3–8 will be explained in further detail. These scenario maps depict a number of scenarios in which the control software system 20 may operate.

Figure 3:
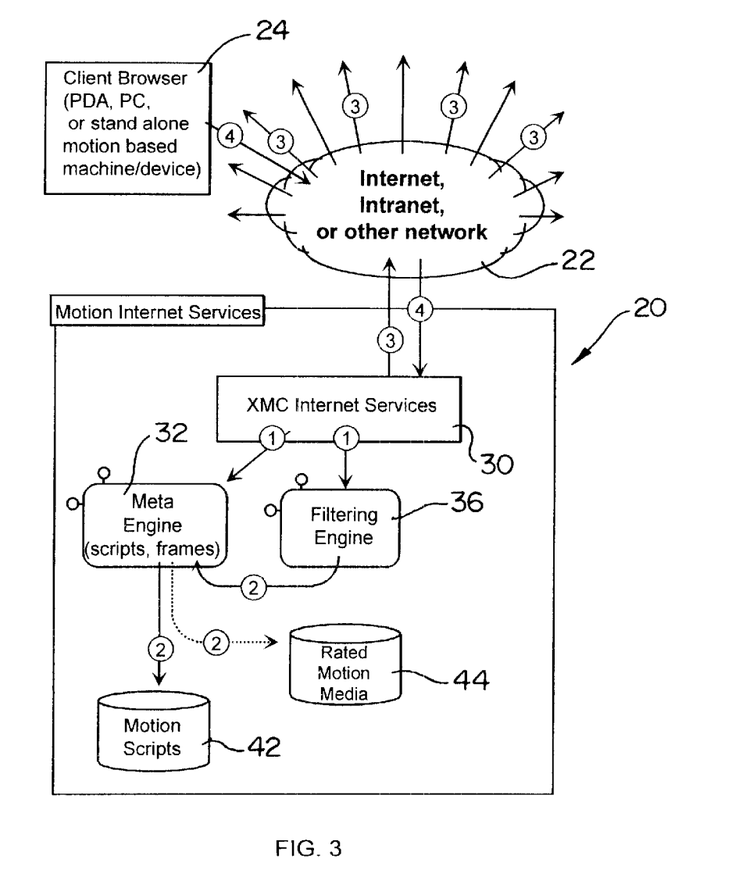
FIGS. 3–8 are module interaction maps depicting how the modules of the motion control system interact under various scenarios.

Referring initially to FIG. 3, depicted therein is a scenario map that describes the broadcasting process in which the host sends information across the network to all targets possible, notifying each that the host is ready to initiate a connection to transmit motion media. Broadcasting consists of initiating a connection with a client by notifying all clients of the host's existence via a connectionless protocol by sending data via the User Diagram Protocol (or UDP). The UDP is a connectionless protocol standard that is part of the standard TCP/IP family of Internet protocols. Once notified that the host has motion media to serve, each target can then respond with an acceptance to complete the connection.

The following steps occur when initiating a connection via broadcasting.

First, before broadcasting any data, the services manager 30 queries the meta engine 32 and the filter engine 36 for the content available and its rating information.

Second, when queried, the filter engine 36 gains access to the enhanced or non-enhanced motion media via the meta engine 32. The filtering engine 36 extracts the rating data and serves this up to the internet services manager 30.

Third, a motion media descriptor is built and sent out across the network. The media descriptor may contain data as simple as a list of ratings for the rated media served. Or the descriptor may contain more extensive data such as the type of media categories supported (i.e., medias for two legged and four legged toys available). This information is blindly sent across the network using a connectionless protocol. There is no guarantee that any of the targets will receive the broadcast. As discussed above, rating data is optional and, if not used, only header information is sent to the target.

Fourth, if a target receives the broadcast, the content rating meets the target rating criteria, and the target is open for a connection, the connection is completed when the target sends an acknowledgement message to the host. Upon receiving the acknowledgement message, the connection is made between host and target and the host begins preparing for dynamic or static content delivery.

Figure 4:
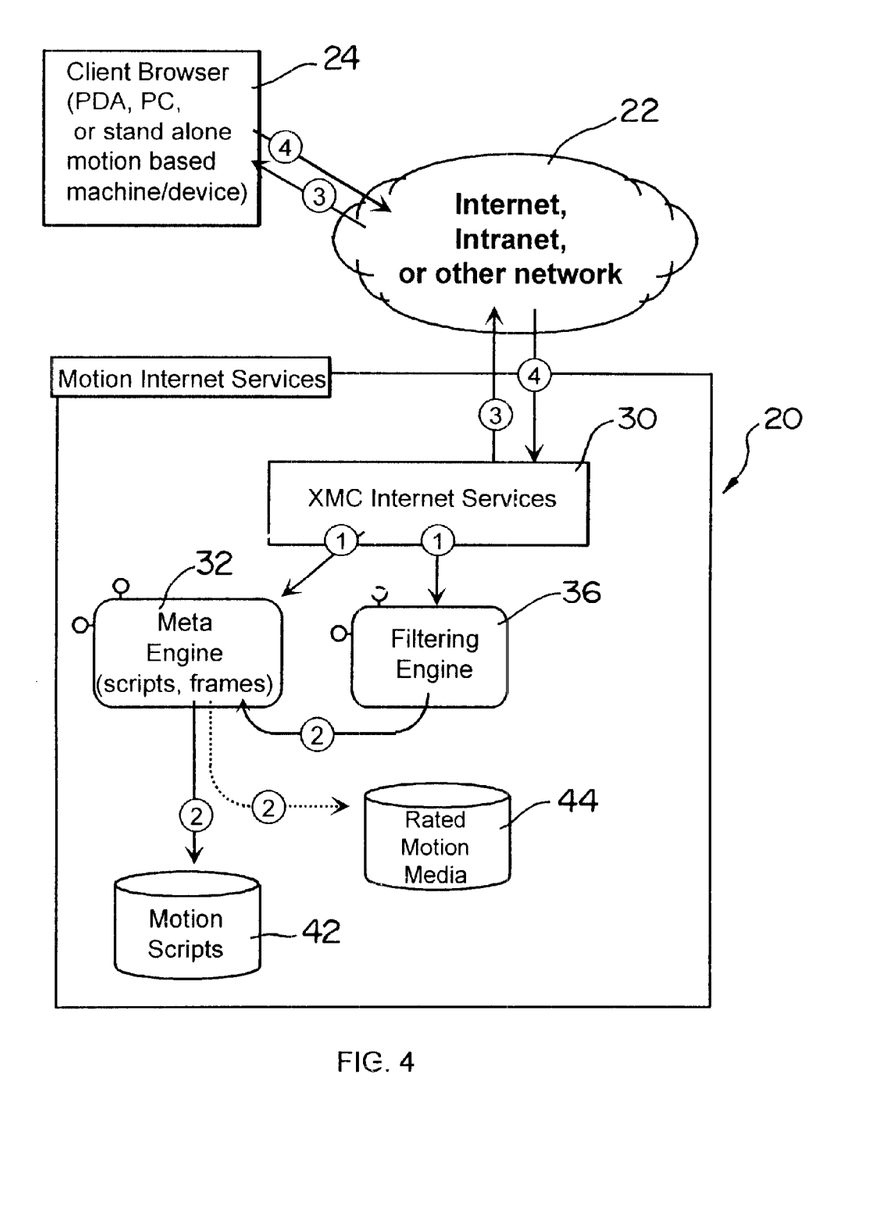

Referring now to FIG. 4, depicted therein is a scenario map illustrating the process of live update connection initiation. A live update connection is a connection based on pre-defined criteria between a host and a target in which the target is previously registered or "known" and the host sends a notification message directly to the known target.

The following steps take place when performing a live-update.

First, the internet services manager 30 collects the motion media and rating information. The motion media information collected is based on information previously registered by by a known or pre-registered target. For example, say the target registers itself as a two-legged toy—in such a case the host would only collect data on two-legged motion media and ignore all other categories of motion media.

Second, when queried, the filtering engine 36 in turn queries the meta engine 32 for the raw rating information. In addition, the meta engine 32 queries header information on the motion media to be sent via the live update.

Third, the motion media header information along with its associated rating information are sent to the target system. If rating information is not used, only the header information is sent to the target.

Fourth, the target system either accepts or rejects the motion media based on its rating or other circumstances, such as the target system is already busy running motion media.

Figure 5:
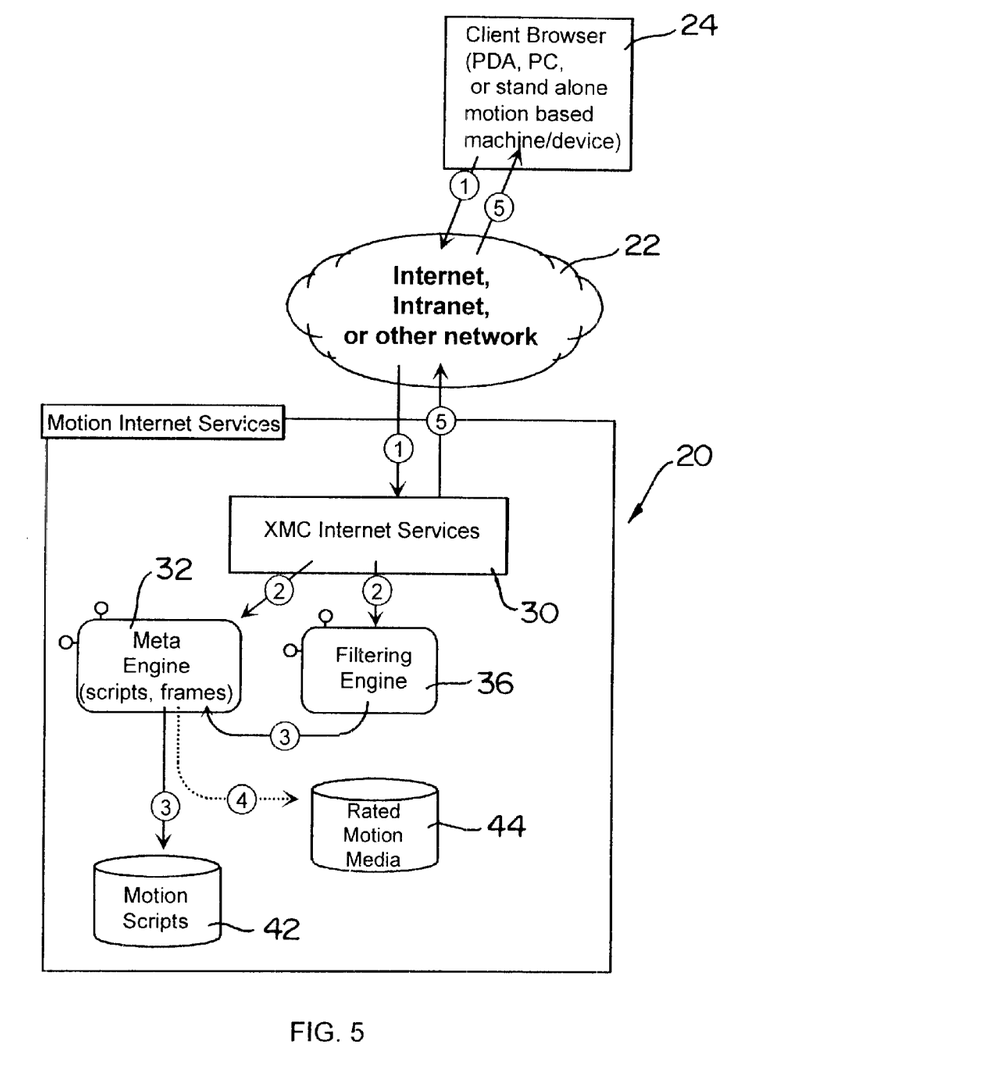

FIG. 5 describes the process of request brokering in master mode in which the target initiates a connection with the host by requesting motion media from the host.

First, to initiate the request broker connection, the target notifies the host that it would like to have a motion media data set delivered. If the target supports content filtering, it also sends the highest rating that it can accept (or the highest that it would like to accept based on the target system's operator input or other parameters) and whether or not to reject or downgrade the media based on the rating.

Second, the services manager 30 queries the meta engine 32 for the requested media and then queries the filter engine 36 to compare the requested rating with that of the content. If the rating does not meet the criteria of the rating rules, the Filter Engine uses the content header downsizing support info to perform Rating Content Downsizing.

Third, the meta engine 32 collects all header information for the requested motion media and returns it to the services manager 30.

Fourth, if ratings are supported, the meta engine 32 also queries all raw rating information from the rated motion media 44. When ratings are used, the rated motion media 44 is used exclusively if available. If the media is already rated, the rated media is sent out. If filtering is not supported on the content server the rating information is ignored and the Raw Motion Scripts or Motion Media data are used.

Fifth, the motion media header information and rating information (if available) are sent back to the requesting target device, which in turn either accepts the connection or rejects it. If accepted, a notice is sent back to the services manager 30 directing it to start preparing for a content delivery session.

Figure 6:
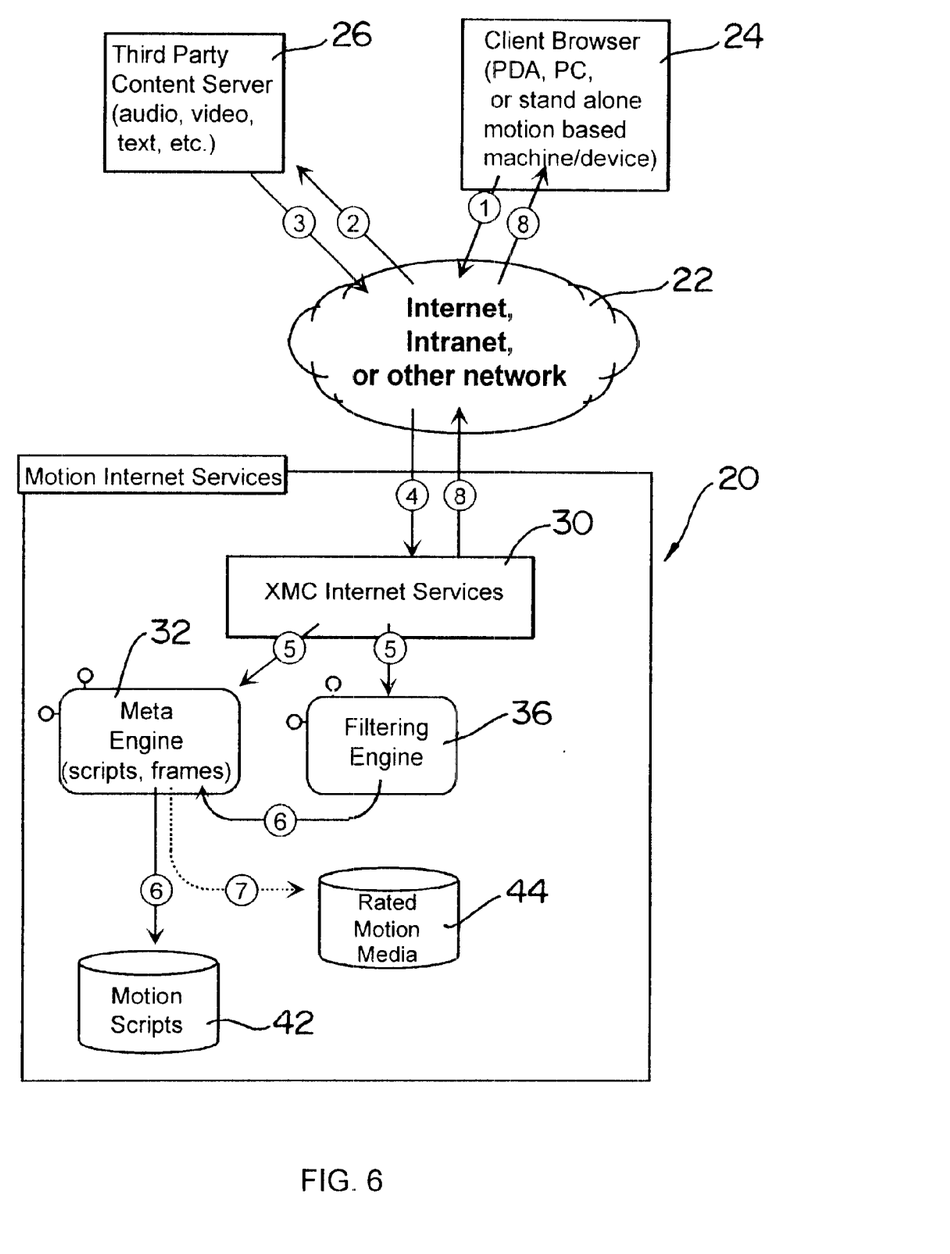

FIG. 6 describes request broker connection initiation in slave mode. In slave mode connection initiation, the target initiates a connection with the third party content server 26, which in turn initiates a connection with the host on behalf of the target system. Request brokering in slave mode is similar to request brokering in master mode, except that the target system communicates directly with a third party content server 26 instead of with the host system.

Slave mode is of particular significance when the third party content site is used to drive the motion content generation. For example, motion media may be generated based on non-motion data generated by the third party content site. A music site may send audio sounds to the host system, which in turn generates motions based on the audio sounds.

The following steps occur when request brokering in slave mode.

First, the target system requests content from the third party content server (e.g., requests a song to play on the toy connected to, or part of the target system).

Second, upon receiving the request, the third party content server locates the song requested.

Third, the third party content server 26 then sends the song name, and possibly the requested associated motion script(s), to the host system 20 where the motion internet service manager 30 resides.

Fourth, upon receiving the content headers from the third party content server 26, the services manager 30 locates the rating information (if any) and requested motion scripts.

Fifth, rating information is sent to the filtering engine 36 to verify that the motion media is appropriate and the requested motion script information is sent to the meta engine 32.

Sixth, the filtering engine 36 extracts the rating information from the requested motion media and compares it against the rating requirements of the target system obtained via the third party content server 26. The meta engine also collects motion media header information.

Seventh, the meta engine 32 extracts rating information from the rated motion media on behalf of the filtering engine 36.

Eighth, either the third party content server is notified, or the target system is notified directly, whether or not the content is available and whether or not it meets the rating requirements of the target. The target either accepts or rejects the connection based on the response. If accepted, the motion internet services begin preparing for content delivery.

Figure 7:
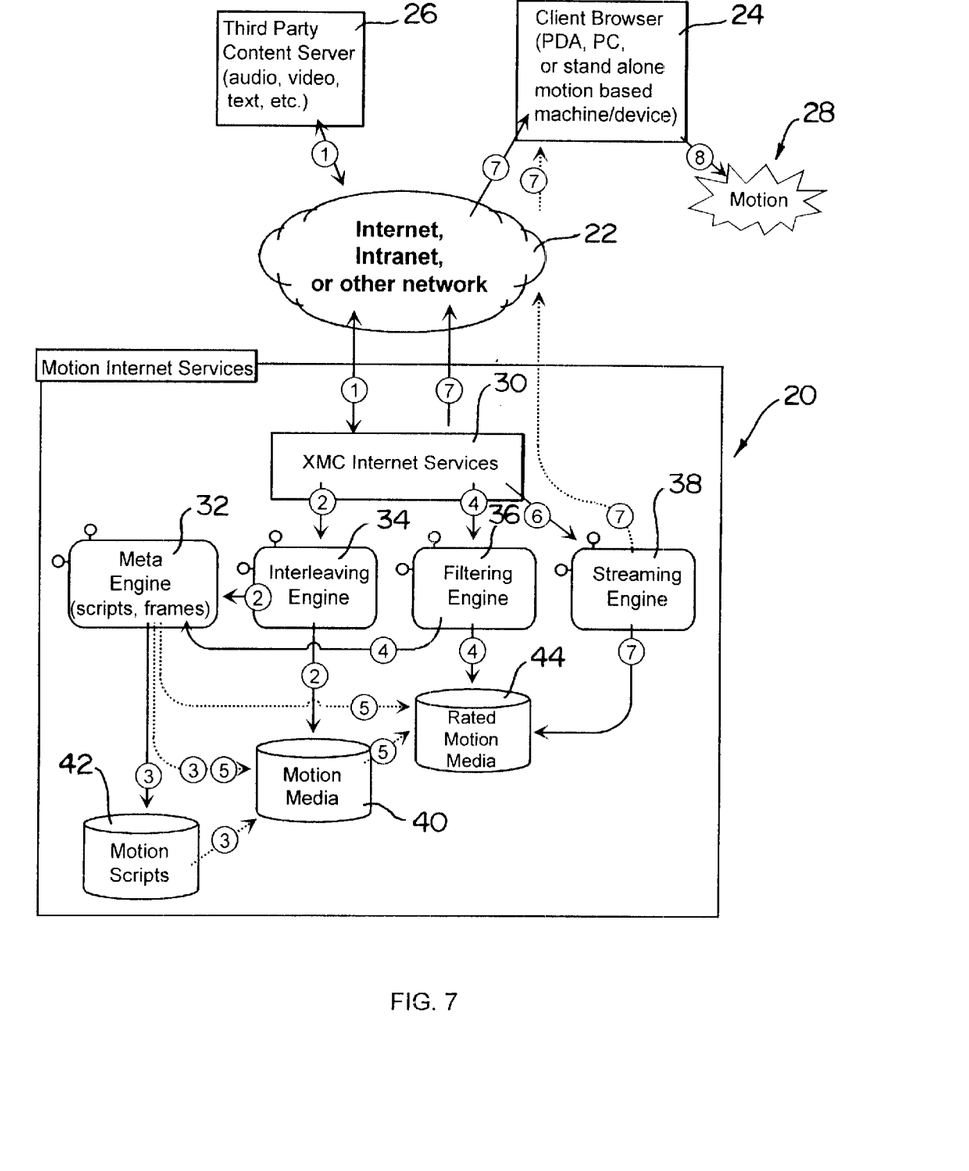

FIG. 7 describes how the host dynamically creates motion media and serves it up to the target system. Once a connection is initiated between host and target, the content delivery begins. Dynamic content delivery involves actually creating the enhanced motion media in real time by mixing motion scripts (either pre-created scripts or dynamically generated scripts) with external media (ie audio, video, etc). In addition, if rating downgrading is requested, the media is adjusted to meet the rating requirements of the target system.

The following steps occur when delivering dynamic content from the host to the target.

In the first step, either content from the third party content server is sent to the host or the host is requested to inject motion media into content managed by the third party content server. The remaining steps are specifically directed to the situation in which content from the third party content server is sent to the host, but the same general logic may be applied to the other situation.

Second, upon receiving the content connection with the third party content server, the services manager 30 directs the interleaving engine 34 to begin mixing the non-motion data (ie audio, video, flash graphics, etc) with the motion scripts.

Third, the interleaving engine 34 uses the meta engine 32 to access the motion scripts. As directed by the interleaving engine 34, the meta engine 32 injects all non-motion data between scripts and/or frames of motion based on the interleaving algorithm (ie time based, data size based or packet count based interleaving) used by the interleaving engine 34. This transforms the motion media data set into the enhanced motion media data set.

Fourth, if ratings are used and downgrading based on the target rating criteria is requested, the filtering engine 36 requests the meta engine 32 to select and replace rejected content based on rating with an equal operation with a lower rating. For example, a less violent move having a lower rating may be substituted for a more violent move having a higher rating. The rated enhanced data set is stored as the rated motion media at the location 44. As discussed above, this step is optional because the service manager 30 may not support content rating.

Fifth, the meta engine 32 generates a final motion media data set as requested by the filtering engine 36.

Sixth, the resulting final motion media data set (containing either enhanced motion media or rated enhanced motion media) is passed to the streaming engine 38. The streaming engine 38 in turn transmits the final data set to the target system.

Seventh, in the case of a small data set, the data may be sent in its entirety before actually played by the target system. For larger data sets (or continually created infinite data sets) the streaming engine sends all data to the target as a data stream.

Eighth, the target buffers all data up to a point where playing the data does not catch up to the buffering of new data, thus allowing the target to continually run motion media.

Figure 8:
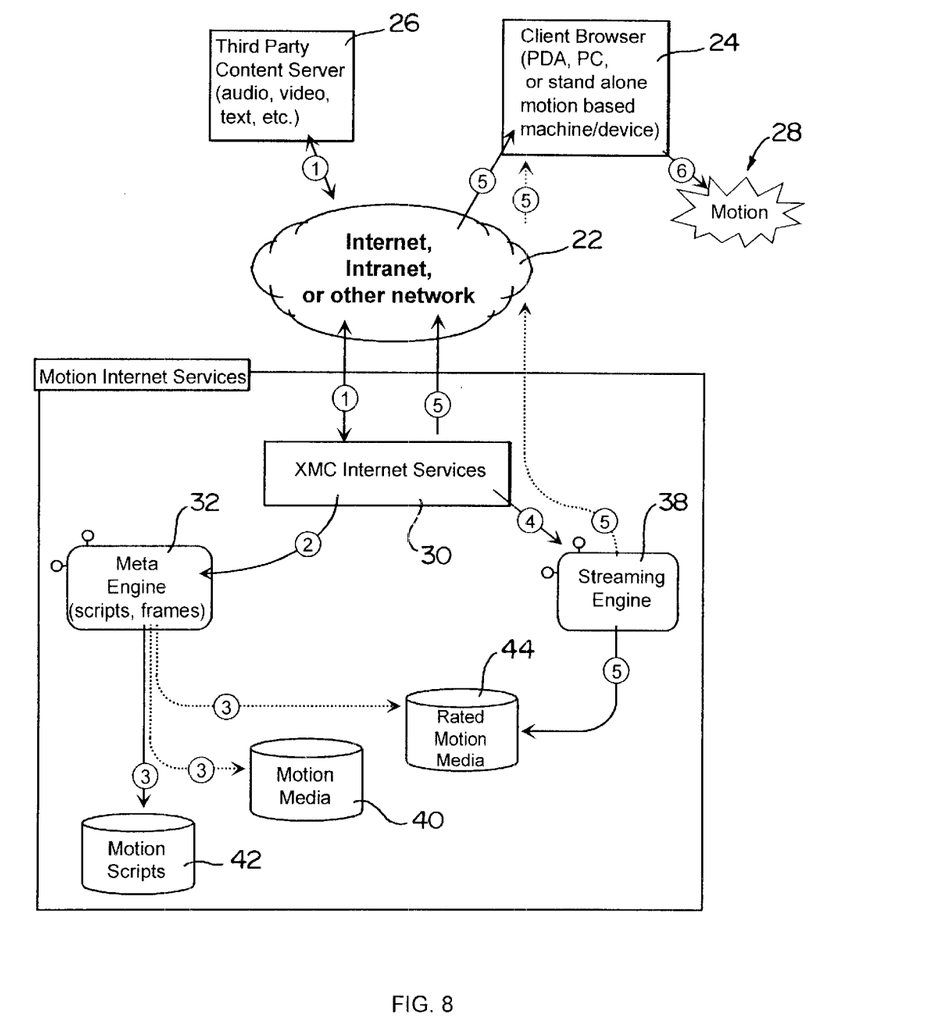

FIG. 8 describes how the host serves up pre-created or static motion media to the target system. Static content delivery is similar to dynamic delivery except that all data is prepared before the request is received from the target. Content is not created on the fly, or in real time, with static content.

The following steps occur when delivering static content from the host to the target.

In the first step, either motion media from the third party content server 26 is sent to the host or the host is requested to retrieve already created motion media. The remaining steps are specifically to the situation in which the host is requested to retrieve already created motion media, but the same general logic may be applied to the other situation.

Second, upon receiving the content connection with the third party content server, the services manager 30 directs the meta engine 32 to retrieve the motion media.

Third, the meta engine 32 retrieves the final motion media data set and returns the location to the services manager 30. Again, the final motion set may include motion scripts, enhanced motion media, rated motion media, or enhanced rated motion media.

Fourth, the final data motion media data set is passed to the streaming engine 38, which in turn feeds the data to the target system.

Fifth, again in the case of a small data set, the data may be sent in its entirety before actually played by the target system. For larger data sets (or continually created infinite data sets) the streaming engine sends all data to the target as a data stream.

Sixth, the target buffers all data up to a point where playing the data does not catch up to the buffering of new data, thus allowing the target to continually run motion media.

The control software system 20 described herein can be used in a wide variety of environments. The following discussion will describe how this system 20 may be used in accordance with several operating models and in several exemplary environments. In particular, the software system 20 may be implemented in the broadcasting model, request brokering model, or the autonomous distribution model. Examples of how each of these models applies in a number of different environments will be set forth below.

The broadcast model, in which a host machine is used to create and store a large collection of data sets that are then deployed out to a set of many target devices that may or may not be listening, may be used in a number of environments. The broadcast model is similar to a radio station that broadcasts data out to a set of radios used to hear the data transmitted by the radio station.

The broadcasting model may be implemented in the several areas of industrial automation. For example, the host machine may be used to generate data sets that are used to control machines on the factory floor. Each data set may be created by the host machine by translating engineering drawings from a known format (such as the data formats supported by AutoCad or other popular CAD packages) into the data sets that are then stored and eventually broadcast to a set of target devices. Each target device may be the same type of machine. Broadcasting data sets to all machines of the same type allows the factory to produce a larger set of products. For example, each target device may be a milling machine. Data sets sent to the group of milling machines would cause each machine to simultaneously manufacture the same part thus producing more than one of the same part simultaneously thus boosting productivity.

Also, industrial automation often involves program distribution, in which data sets are translated from an engineering drawing that is sent to the host machine via an Internet (or other network) link. Once received the host would translate the data into the type of machine run at one of many machine shops selected by the end user. After translation completes, the data set would then be sent across the data link to the target device at the designated machine shop, where the target device may be a milling machine or lathe. Upon receiving the data set, the target device would create the mechanical part by executing the sequence of motions defined by the data set. Once created the machine shop would send the part via mail to the user who originally sent their engineering drawing to the host. This model has the benefit of giving the end user an infinite number of machine shops to choose from to create their drawing. On the other hand, this model also gives the machine shops a very large source of business that sends them data sets tailored specifically for the machines that they run in their shop.

The broadcasting model of the present invention may also be of particular significance during environmental monitoring and sampling. For example, in the environmental market, a large set of target devices may be used in either the monitoring or collection processes related to environmental clean up. In this example, a set of devices may be used to stir a pool of water along different points on a river, where the stirring process may be a key element in improving the data collection at each point. A host machine may generate a data set that is used to both stir the water and then read from a set of sensors in a very precise manner. Once created the data set is broadcast by the host machine to all devices along the river at the same time to make a simultaneous reading from all devices along the river thus giving a more accurate picture in time on what the actual waste levels are in the river.

The broadcasting model may also be of significance in the agriculture industry. For example, a farmer may own five different crop fields that each requires a different farming method. The host machine is used to create each data set specific to the field farmed. Once created, the host machine would broadcast each data set to a target device assigned to each field. Each target device would be configured to only listen to a specific data channel assigned to it. Upon receiving data sets across its assigned data channel, the target device would execute the data set by running each meta command to perform the tilling or other farming methods used to harvest or maintain the field. Target devices in this case may be in the form of standard farming equipment retrofitted with motors, drives, a motion controller, and an software kernel (such as the XMC real-time kernel) used to control each by executing each meta command. The farming operations that may be implemented using the principles of the present invention include watering, inspecting crops, fertilizing crops and/or harvesting crops.

The broadcasting model may also be used in the retail sales industry. For example, the target devices may be a set of mannequins that are employ simple motors, drives, a motion controller, and a software kernel used to run meta commands. The host machine may create data sets (or use ones that have already been created) that are synchronized with music selections that are about to play in the area of the target mannequins. The host machine is then used to broadcast the data sets in a manner that will allow the target device to dance (or move) in a manner that is in sync with the music playing thus giving the illusion that the target device is dancing to the music. This example is useful for the retailer for this form of entertainment attracts attention toward the mannequin and eventually the clothes that it wears. The host machine may send data sets to the target mannequin either over a hard wire network (such as Ethernet), across a wireless link, or some other data link. Wireless links would allow the mannequins to receive updates while still maintaining easy relocation.

The broadcasting model may also be used in the entertainment industry. One example is to use the present invention as part of a biofeedback system. The target devices may be in the form of a person, animal or even a normally inanimate object. The host machine may create data sets in a manner that creates a feedback loop. For example a band may be playing music that the host machine detects and translates into a sequence of coordinated meta commands that make up a stream (or live update) of data. The data stream would then be broadcast to a set of target devices that would in-turn move in rhythm to the music. Other forms of input that may be used to generate sequences of meta commands may be some of the following: music from a standard sound system; heat detected from a group of people (such as a group of people dancing on a dance floor); and/or the level of noise generated from a group of people (such as an audience listening to a rock band).

The broadcasting model may also have direct application to consumers. In particular, the present invention may form part of a security system. The target device may be something as simple as a set of home furniture that has been retrofitted with a set of small motion system that is capable of running meta commands. The host machine would be used to detect external events that are construed to be compromising of the residence security. When detected motion sequences would be generated and transmitted to the target furniture, thus giving the intruder the impression that the residence is occupied thus reducing the chance of theft. Another target device may be a set of curtains. Adding a sequence of motion that mimic that of a person repeatedly pulling on a line to draw the curtains could give the illusion that a person was occupying the residence.

The broadcasting model may also be applied to toys and games. For example, the target device may be in the form of an action figures (such as GI Joe, Barbie and/or Start Wars figures). The host machine in this case would be used to generate sequences of motion that are sent to each target device and then played by the end user of the toy. Since the data sets can be hardware independent, a particular data set may work with a wide range of toys built by many different manufacturers. For example, GI Joe may be build with hardware that implements motion in a manner that is very different from the way that Barbie implements or uses motion hardware. Using the motion kernel to translate all data from hardware independent meta commands to hardware specific logic use to control each motor, both toys could run off the same data set. Combining this model with the live updates and streaming technology each toy could receive and run the same data set from a centralized host.

The request brokering model also allows the present invention to be employed in a number of environments. Request brokering is the process of the target device requesting data sets from the host who in turn performs a live update or streaming of the data requested to the target device.

Request brokering may also be applied to industrial automation. For example, the present invention implemented using the request brokering model may be used to perform interactive maintenance. In this case, the target device may be a lathe, milling machine, or custom device using motion on the factory floor. When running data sets already broadcast to the device, the target device may be configured to detect situations that may eventually cause mechanical breakdown of internal parts or burnout of electronic parts such as motors. When such situations are detected, the target device may request for the host to update the device with a different data set that does not stress the parts as much as those currently being executed. Such a model could improve the lifetime of each target device on the factory floor.

Another example of the request brokering model in the industrial automation environment is to the material flow process. The target device in this example may be a custom device using motion on the factory floor to move different types of materials into a complicated process performed by the device that also uses motion. Upon detecting the type of material the target device may optionally request a new live update or streaming of data that performs the operations special to the specific type of material. Once requested, the host would transmit the new data set to the device that would in turn execute the new meta commands thus processing the material properly. This model would extend the usability of each target device for each could be used on more than one type of material and/or part and/or process.

The request brokering model may also be applied to the retail industry. In one example, the target device would be a mannequin or other target device use to display or draw attention to wares sold by a retailer. Using a sensor to detect location within a building or other space (i.e. a global positioning system), the target device could detect when it is moved from location to location. Based on the location of the device, it would request for data sets that pertain to its current location by sending a data request to the host pertaining to the current location. The host machine would then transmit the data requested. Upon receiving the new data, the device would execute it and appear to be location aware by changing its behavior according to its location.

The request brokering model may also be applied to toys and games or entertainment industry. Toys and entertainment devices may also be made location aware. Other devices may be similar to toys or even a blend between a toy and a mannequin but used in a more adult setting where the device interacts with adults in a manner based on the device's location. Also biofeedback aware toys and entertainment devices may detect the tone of voice used or sense the amount of pressure applied to the toy by the user and then use this information to request a new data set (or group of data sets) to alter its behavior thus appearing situation aware. Entertainment devices may be similar to toys or even mannequins but used in a manner to interact with adults based on biofeedback, noise, music, etc.

The autonomous distribution model may also be applied to a number of environments. The autonomous distribution model is where each device performs both host and target device tasks. Each device can create, store and transmit data like a host machine yet also receive and execute data like a target device.

In industrial automation, the autonomous distribution model may be implemented to divide and conquer a problem. In this application, a set of devices is initially configured with data sets specific to different areas making up the overall solution of the problem. The host machine would assign each device a specific data channel and perform the initial setup across it. Once configured with its initial data sets, each device would begin performing their portion of the overall solution. Using situation aware technologies such as location detection and other sensor input, each target device would collaborate with one another where their solution spaces cross or otherwise overlap. Each device would not only execute its initial data set but also learn from its current situation (location, progress, etc) and generate new data sets that may either apply to itself or transmitted to other devices to run.

In addition, based on the devices situation, the device may request new data sets from other devices in its vaccinate in a manner that helps each device collaborate and learn from one another. For example, in an auto plant there may be one device that is used to weld the doors on a car and another device used to install the windows. Once the welding device completes welding it may transmit a small data set to the window installer device thus directing it to start installing the windows. At this point the welding device may start welding a door on a new car.

The autonomous distribution model may also be applied to environmental monitor and control systems. For example, in the context of flow management, each device may be a waste detection device that as a set are deployed at various points along a river. In this example, an up-stream device may detect a certain level of waste that prompts it to create and transmit a data set to a down-stream device thus preparing it for any special operations that need to take place when the new waste stream passes by. For example, a certain type of waste may be difficult to detect and must use a high precision and complex procedure for full detection. An upstream device may detect small traces of the waste type using a less precise method of detection that may be more appropriate for general detection. Once detecting the waste trace, the upstream device would transmit a data set directing the downstream device to change to its more precise detection method for the waste type.

In agriculture, the autonomous distribution model has a number of uses. In one example, the device may be an existing piece of farm equipment used to detect the quality of a certain crop. During detection, the device may detect that the crop needs more water or more fertilizer in a certain area of the field. Upon making this detection, the device may create a new data set for the area that directs another device (the device used for watering or fertilization) to change it's watering and/or fertilization method. Once created the new data set would be transmitted to the target device.

The autonomous distribution model may also be applied to the retail sales environments. Again, a dancing mannequin may be incorporated into the system of the present invention. As the mannequin dances, it may send data requests from mannequins in its area and alter its own meta commands sets so that it dances in better sync with the other mannequins.

Toys and games can also be used with the autonomous distribution model. Toys may work as groups by coordinating their actions with one another. For example, several Barbie dolls may interact with one another in a manner where they dance in sequence or play house.

From the foregoing, it should be clear that the present invention may be embodied in forms other than those described above. The scope of the present invention should thus be determined by the claims ultimately allowed and not the foregoing detailed discussion of the preferred embodiments,

What is claimed is:

1. A method of communicating motion data through a communications network, the method comprising the steps of:

connecting a control software system, a content server, and a client browser to the communications network;

storing a plurality of motion programs at the content server, where each motion program corresponds to a motion sequence;

connecting to the client browser a target device capable of translating motion media into physical movement;

selecting a selected motion program stored on the content server using the client browser, where the selected motion program corresponds to a desired motion sequence;

transferring the selected motion program from the content server to the control software system;

generating motion media at the control software system based on the selected motion program by generating motion packets based on the selected motion program;

transferring the motion media from the control software system to the client browser by transferring motion packets to the client browser;

transferring the motion media from the client browser to the target device; and operating the target device based on the motion media to create physical movement corresponding to the desired motion sequence.

2. A method as recited in claim 1, further comprising the steps of:

storing non-motion data at the content server;

selecting selected non-motion data stored on the content server using the client browser, where the selected non-motion data corresponds to a desired non-motion task;

transferring the selected non-motion data from the content server to the control software system;

transferring the selected non-motion data from the control software system to the client browser; and playing the non-motion data to perform the desired non-motion task.

3. A method as recited in claim 1, further comprising the steps of:

storing ratings rules associated with the client browser; and modifying the motion media based on the ratings rules.

4. A method as recited in claim 1, in which the motion program is independent of the target device and the step of generating the motion media further comprises the step of converting the motion program into the motion media based on characteristics of the target device.

5. A method as recited in claim 1, in which the motion program is created based on characteristics of the target device.

6. A method as recited in claim 1, in which the step of connecting to the client browser a target device capable of translating motion media into physical movement comprises the step of providing a target device further capable of playing non-motion data, the method further comprising the steps of:

storing non-motion data at the content server;

selecting selected non-motion data stored on the content server using the client browser, where the selected non-motion data corresponds to a desired non-motion task;

transferring the selected non-motion data from the content server to the control software system;

combining the selected non-motion data with the motion media at the control software system to obtain enhanced motion media;

transferring the enhanced motion media from the client browser to the target device; and operating the target device based on the enhanced motion media to create physical movement corresponding to the desired motion sequence and to perform the desired non-motion task.

7. A method as recited in claim 1, in which the step of generating motion packets based on the selected motion program further comprises the step of generating, based on the desired motion sequence, motion frames comprising at least one motion packet.

8. A method of communicating motion data through a communications network, the method comprising the steps of:

connecting a control software system, a content server, and a client browser to the communications network;

storing a plurality of motion programs at the content server, where each motion program corresponds to a motion sequence;

connecting to the client browser a target device capable of translating motion media into physical movement;

selecting a selected motion program stored on the content server using the client browser, where the selected motion program corresponds to a desired motion sequence;

transferring the selected motion program from the content server to the control software system;

generating motion media at the control software system based on the selected motion program by generating motion packets based on the selected motion program, and combining the motion packets into a motion script corresponding to entire the motion media; and transferring the motion media from the control software system to the client browser;

transferring the motion media from the client browser to the target device by transferring the motion script to the client browser; and operating the target device based on the motion media to create physical movement corresponding to the desired motion sequence.

9. A method as recited in claim 8, further comprising the steps of:

storing non-motion data at the content server;

selecting selected non-motion data stored on the content server using the client browser, where the selected non-motion data corresponds to a desired non-motion task;

transferring the selected non-motion data from the content server to the control software system;

transferring the selected non-motion data from the control software system to the client browser; and playing the non-motion data to perform the desired non-motion task.

10. A method as recited in claim 8, further comprising the steps of:

storing ratings rules associated with the client browser; and modifying the motion media based on the ratings rules.

11. A method as recited in claim 8, in which the motion program is independent of the target device and the step of generating the motion media further comprises the step of converting the motion program into the motion media based on characteristics of the target device.

12. A method as recited in claim 8, in which the motion program is created based on characteristics of the target device.

13. A method as recited in claim 8, in which the step of connecting to the client browser a target device capable of translating motion media into physical movement comprises the step of providing the target device comprises further capable of playing non-motion data, the method further comprising the steps of:

storing non-motion data at the content server;

selecting selected non-motion data stored on the content server using the client browser, where the selected non-motion data corresponds to a desired non-motion task;

transferring the selected non-motion data from the content server to the control software system;

combining the selected non-motion data with the motion media at the control software system to obtain enhanced motion media;

transferring the enhanced motion media from the client browser to the target device; and operating the target device based on the enhanced motion media to create physical movement corresponding to the desired motion sequence and to perform the desired non-motion task.

14. A method as recited in claim 8, in which the step of generating motion packets based on the selected motion program further comprises the step of generating, based on the desired motion sequence, motion frames comprising at least one motion packet.

* * * * *